United States Patent
Ge et al.

(10) Patent No.: US 9,888,257 B2
(45) Date of Patent: Feb. 6, 2018

(54) METHOD AND APPARATUS OF STORAGE CONTROL FOR DEPTH PERCEPTION COMPUTATION

(71) Applicant: RGBDsense Information Technology Ltd., Ningbo (CN)

(72) Inventors: Chenyang Ge, Xi'an (CN); Yanhui Zhou, Xi'an (CN)

(73) Assignee: RGBDSENSE INFORMATION TECHNOLOGY LTD., Ningbo (CN)

( * ) Notice: Subject to any disclaimer, the term of this patent is extended or adjusted under 35 U.S.C. 154(b) by 125 days.

(21) Appl. No.: 15/171,509

(22) Filed: Jun. 2, 2016

(65) Prior Publication Data
US 2016/0373719 A1 Dec. 22, 2016

(30) Foreign Application Priority Data
Jun. 16, 2015 (CN) .......................... 2015 1 0334294

(51) Int. Cl.
*H04N 19/597* (2014.01)
*G06T 7/521* (2017.01)

(52) U.S. Cl.
CPC ........... *H04N 19/597* (2014.11); *G06T 7/521* (2017.01)

(58) Field of Classification Search
CPC ........... G06T 7/521; G06T 7/514; G06T 7/55; G06T 2207/10016; G06T 2207/10028; G06T 2207/20212; G06T 7/50; H04N 19/597
USPC ....................................................... 382/154
See application file for complete search history.

(56) References Cited

U.S. PATENT DOCUMENTS

| | | | |
|---|---|---|---|
| 6,750,904 B1* | 6/2004 | Lambert | G02B 27/2214 348/218.1 |
| 2003/0128405 A1* | 7/2003 | Tay | H04N 1/32358 358/474 |
| 2015/0229911 A1* | 8/2015 | Ge | H04N 13/0239 348/47 |

FOREIGN PATENT DOCUMENTS

CN 103796004 A * 5/2014 ......... H04N 13/0239

* cited by examiner

*Primary Examiner* — Chan Park
*Assistant Examiner* — Geoffrey E Summers
(74) *Attorney, Agent, or Firm* — Birch, Stewart, Kolasch & Birch, LLP

(57) ABSTRACT

The present invention discloses a method and apparatus of storage control for depth perception computation. The method comprises: sequentially reading each part of image data for splicing a binarized spliced image according to a preset write mapping rule, the image data being originated from each frame of image in a group of binarized structured-light encoded image sequences; writing, by a read/write controller, the each part that is spliced into a binarized spliced image into a memory for storage, so as to generate a frame of complete binarized spliced image; then, through changing an address mapping, solidifying the generated binarized spliced image at a certain position within the memory; when in use, one or more frames of binarized spliced images are read out in sequence as reference encoded images for depth perception computation. Meanwhile, based on a corresponding method function, an apparatus of storage control for depth sensing computation; by module partition, it facilitates application management, optimizes the hardware-implemented depth sensing computation structure and area, and enhances the computation speed.

10 Claims, 3 Drawing Sheets

METHOD AND APPARATUS OF STORAGE CONTROL FOR DEPTH PERCEPTION COMPUTATION

FIELD OF THE INVENTION

The present invention relates to the technical fields of image processing, natural interaction, and integrated circuit, and more specifically relates to a method and apparatus of storage control for depth perception computation.

BACKGROUND OF THE INVENTION

A natural and harmonious human-machine interaction approach is an ideal objective of human beings in manipulating machines, which enables a machine to understand a command transmitted by a person in a natural state. A depth perception technology, as a core technology for human-machine natural interaction, has a wide application prospect in fields such as machine vision, intelligent monitoring, 3D rebuilding, somatosensory interaction, 3D printing, etc. A structured light-based active visual mode, e.g., by projecting, with infrared laser, images of a fixed mode onto a surface of an object so as to encode the surface, collecting the infrared encoded images by an image sensor, and then computing depth information of the object through depth perception, may obtain depth information of an image more accurately. In the near future, the structured light-encoded 3D depth perception technology will take a dominant position.

An infrared encoded image of known depth information is stored as a reference encoded image using a storage device; in use, the stored encoded image is outputted for depth computation, which facilitates the image processing technology to obtain depth information for real-time identifying a 3D-image and capturing actions, so as to make it possible for a person to interact with a terminal using natural manners such as expressions, gestures, and somatosensory actions. Hardware implementation of the depth perception computation may have the following advantages: simple structure, small hardware overheads, and real-time generation of a high-resolution depth image sequence. However, the hardware implementation of the depth perception computation has to face issues such as how to efficiently store encoded images, support of data input output protocols, and how to save hardware resource overheads.

SUMMARY OF THE INVENTION

In view of the above, the present invention provides a method and apparatus of storage control for depth perception computation, for satisfying storage control with respect to reading/writing binarized structured-light encoded images for depth perception computation. Specifically, through a preset write flash mapping relationship, multiple frames of input binarized encoded images are spliced to obtain one frame of binarized spliced image, and then one or more frames of binarized spliced images are solidified in a memory, which, when being used, are read out as a reference encoded image for a three-dimensional depth perception module to perform block matching disparity computation and depth computation.

In order to achieve the above inventive objective, there is provided a method of storage control for depth perception computation, the method comprising: sequentially reading each part of image data for splicing a binarized spliced image according to a preset write mapping rule, the image data being originated from each frame of image in a group of binarized structured-light encoded image sequences; writing, by a read/write controller, the each part that is spliced into a binarized spliced image into a memory for storage, so as to generate a frame of complete binarized spliced image; then, through changing an address mapping, solidifying the generated binarized spliced image at a certain position within the memory;

wherein, the group of structured-light encoded image sequences are encoded images that are projected by a laser projector onto a projection plane vertical to its optical axis (Z-axis) and consecutively acquired by a camera, the laser projector being parallel to an optical axis of the camera, a baseline distance being S, a vertical distance of the projection plane from the camera and the laser projector along the optical axis being a known distance d;

The binarized spliced image is a kind of reference encoded image for performing block matching disparity computation to images in a structured-light encoded image sequence which are subjected to the same binarized processing, and outputting a disparity graph represented by an offset for depth perception computation;

The depth perception computation derives a corresponding depth value d' according to a depth computation equation below in conjunction with a camera focal distance f, spot distance $\mu$ of the camera image sensor, a baseline distance S between the laser projector and the camera, and an offset parameter $\Delta m$ ($\Delta x$ or $\Delta y$) of the disparity graph, and a known distance parameter d of the reference encoded image:

$$d' = d - \frac{\Delta m \mu d^2}{fS + \Delta m \mu d} = \frac{fSd}{fS + \Delta m \mu d}.$$

There is also provided an apparatus of storage control for depth perception computation, the apparatus comprises a write mapping module, a read/write control module, and a memory;

The write mapping module is configured to sequentially read each part of image data for splicing a binarized spliced image according to a preset write mapping rule, the image data being originated from each frame of image in a group of binarized structured-light encoded image sequences;

The read/write control module is configured to write each part of image data that is spliced into a binarized spliced image into a memory for storage so as to generate a frame of complete binarized spliced image;

The read/write control module is configured to solidify, through changing an address mapping, the generated binarized spliced image at a certain position within the memory;

wherein;

the group of structured-light encoded image sequences are encoded images that are projected by a laser projector onto a projection plane vertical to its optical axis (Z-axis) and consecutively acquired by a camera, the laser projector being parallel to an optical axis of the camera, a baseline distance being S, a vertical distance of the projection plane from the camera and the laser projector along the optical axis being a known distance d;

The binarized spliced image is a kind of reference encoded image for performing block matching disparity computation to images in a structured-light encoded image sequence which are subjected to the same binarized processing, and outputting a disparity graph represented by an offset for depth perception computation;

The depth perception computation derives a corresponding depth value d' according to a depth computation equation below in conjunction with a camera focal distance f, spot distance µ of the camera image sensor, a baseline distance S between the laser projector and the camera, and an offset parameter Δm (Δx or Δy) of the disparity graph, and a known distance parameter d of the reference encoded image:

$$d' = d - \frac{\Delta m \mu d^2}{fS + \Delta m \mu d} = \frac{fSd}{fS + \Delta m \mu d}.$$

By storing, using a storage device, multiple frames of binarized spliced images as reference encoded images, and outputting, when in use, the stored binarized spliced images for depth computation, the method according to the present invention facilitates obtaining the depth information using an image processing technology to real-time identify 3D images and capture actions. The function of the method is implemented through a hardware-performed method, which will facilitate optimization of a method and apparatus that has achieved depth sensing computation, thereby enhancing the performance of the depth sensing computation.

BRIEF DESCRIPTION OF THE ACCOMPANYING DRAWINGS

DETAILED DESCRIPTION OF THE PREFERRED EMBODIMENTS

Figure 1:
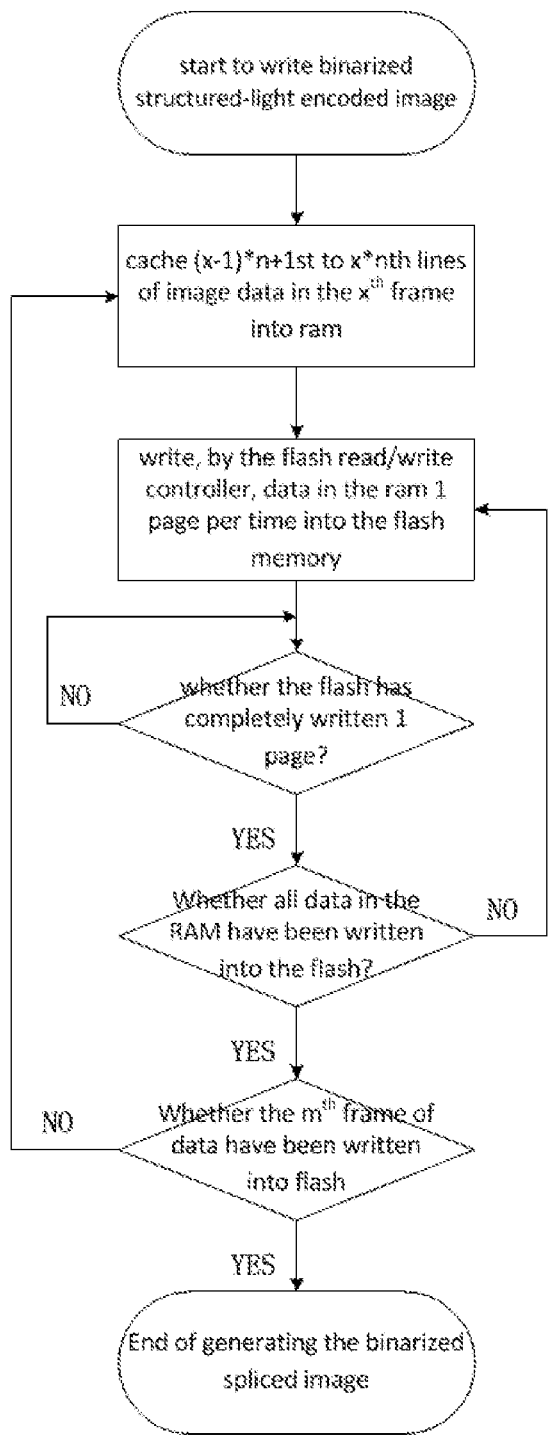
FIG. 1 illustrates a schematic diagram of a method of generating and writing a binarized spliced image in a memory according to an embodiment of the present invention.

In a basic embodiment, the method comprises: sequentially reading each part of image data for splicing a binarized spliced image according to a preset write mapping rule, the image data being originated from each frame of image in a group of binarized structured-light encoded image sequences; writing, by a read/write controller, the each part that is spliced into a binarized spliced image into a memory for storage, so as to generate a frame of complete binarized spliced image; then, through changing an address mapping, solidifying the generated binarized spliced image at a certain position within the memory;

wherein, the group of structured-light encoded image sequences are encoded images that are projected by a laser projector onto a projection plane vertical to its optical axis (Z-axis) and consecutively acquired by a camera, the laser projector being parallel to an optical axis of the camera, a baseline distance being S, a vertical distance of the projection plane from the camera and the laser projector along the optical axis being a known distance d;

The binarized spliced image is a kind of reference encoded image for performing block matching disparity computation to images in a structured-light encoded image sequence which are subjected to the same binarized processing, and outputting a disparity graph represented by an offset for depth perception computation;

The depth perception computation derives a corresponding depth value d' according to a depth computation equation below in conjunction with a camera focal distance f, spot distance µ of the camera image sensor, a baseline distance S between the laser projector and the camera, and an offset parameter Δm (Δx or Δy) of the disparity graph, and a known distance parameter d of the reference encoded image:

$$d' = d - \frac{\Delta m \mu d^2}{fS + \Delta m \mu d} = \frac{fSd}{fS + \Delta m \mu d}.$$

In this embodiment, there is provided a method of storing a reference encoded image needed for depth perception computation. The method does not care the form of the memory or the specific write mapping relationship, which only requires the stored image information should be available for depth perception computation in the embodiment. The image information for depth perception computation is stored and solidified, which, when being used, is outputted for depth computation. This facilitates obtaining the depth information using the image processing technology so as to real-time identify a three-dimensional image and capturing actions, making it possible for a person to interact with a terminal using natural manners such as expressions, gestures, and somatosensory actions.

The binarized processing is converted from a grayscale image to a binarized encoded image represented by "0, 1," wherein "1" represents a speckle or an encoded symbol, e.g., a laser speckle image, an M-array symbol encoded image, or other structured-light encoded image, including video format conversion (e.g., Bayer, ITU601, ITU656, MIPI interface format conversion), chroma space conversion, grayscale image adaptive de-noising and binarized enhancement, etc. Its purpose is to make the projected image much clearer and reduce noise cancellation through pre-processing the inputted structured-light encoded image, thereby facilitating subsequent depth perception computation.

In this embodiment, a frame of binarized spliced image is generated and solidified from a group of structured-light encoded image sequences; different groups of structured-light encoded image sequences have different image data contents, which may be derived according to different parameters, including adjusting different known distances d, adjusting different image sensor focal lengths f, and among other parameters. Besides, the image data contents of different groups of structured light encoded image sequences may be obtained based on different application environments, e.g., temperature, humidity, work temperature or duration of the laser projector, and the like, resulting in different image data contents. The image data contents of different frames of binarized spliced images generated from images of different groups of structured-light encoded image sequences are also different. When being used, a binarized spliced image as a reference encoded image may be simultaneously applied to one or more frames, and even only one frame is adopted, a frame of binarized spliced image solidified at a different position may also be read out.

In one embodiment, the depth computation is implemented by hardware. Preferably, in order to reduce a PCB layout area, the memory is a serial-port flash that supports SPI/QPI interface protocol. The serial-port flash is selected also because it supports SPI and QPI standard protocols. As the data read/write clock frequency it supports becomes increasingly higher, e.g., supporting a clock of 100 Mhz or higher, the flash may reduce the number of pins needed for reading data within the flash to a great margin compared with the parallel port. In many application scenarios, the serial-port flash has replaced the parallel-port flash, and the application scope becomes increasingly broader. Moreover, while the data throughput frequency of the serial-port flash may satisfy the design requirements, the complexity and pin number of a master chip for reading/writing a flash can be much reduced, thereby facilitating lowering costs and reducing the PCB layout area. With the serial-port flash as a memory for depth perception computation, it facilitates optimization of the chip structure and reduction of the chip area and volume.

In one embodiment, there is provided a detailed generating step of generating a binarized spliced image, specifically comprising:

S1. sequentially inputting a part of image data for being spliced into a binarized spliced image into a cache according to a preset write mapping rule;

S2. writing, through a read/write controller, data one page each time in the cache into a serial-port flash, till the data on the page are completely written;

S3. checking, whether data in the cache have been completely written into the serial-port flash memory; if data remains in the cache, repeating step S2; otherwise, performing step S4;

S4. checking whether all data of images in the group of structured-light encoded image sequences for being spliced into a binarized spliced image have been completely written into a serial-port flash memory; if so, generating a frame of binarized spliced image; otherwise, re-performing steps S1~S3.

In this embodiment, image data needed for forming a binarized spliced image are written into a cache according to a certain writing rule; under the action of a read/write controller, data read into the cache are sequentially written, with a unit of one page as physically stored, into the serial-port flash memory, and after all image data have been completely read, a frame of complete binarized spliced image is generated.

The reason of using one physically stored page as a unit is that programming of the serial-port flash allows at most writing data of 1 page (i.e., 256 bytes, or 2048 bits); moreover, after the flash receives 1-page data, it needs a period of page programming time to refurbish the storage unit; a typical value of the serial-port flash page programming time is typically about 1 ms, with a maximum value being about 5 ms; during the page programming time, the flash will not receive other read, erase, or write instructions. For example, if the frame frequency for inputting the structured-light encoded image sequence is 30 Hz, i.e., 33.33 ms for each frame of image, then after the flash completely stores 1 Page data, the image has past several or even dozens of lines; therefore, it is impossible to real-time store the same frame of image data into a flash using a serial-port flash.

In one embodiment, a write mapping rule is provided for a depth perception computing method in a basic embodiment. The write mapping rule is specifically provided as follows:

inputting the $(x-1)*n+1^{st}$ to $x*n^{th}$ lines of image data in the $x^{th}$ frame of input binarized encoded image into a cache for storage;

the value of the n is set based on the memory; and it is ensured that within the time of one frame, the read/write controller can store n lines of data into the memory.

Under the write mapping rule, it may be known that if the dimension of the input binarized encoded image is M columns by N lines, consecutive n (n=1, 2, 3 . . . ) lines of data are selected from each frame of input binarized encoded image to be written into a RAM cache module composed of n-line storage for being cached, and then are spliced according to a preset write flash mapping method, then m=N/n frames of images in total are needed.

Hereinafter, refer to FIG. 1, in which an embodiment of how to generate a frame of binarized spliced image in a serial-port flash memory according to the write mapping rule is presented: caching the $(x-1)*n+1^{st}$ to $x*n^{th}$ lines of image data in the $x^{th}$ frame of input binarized encoded image into a RAM; writing data in the RAM, by a read/write controller, into a flash 1 page per time; determining, by the read/write controller, whether the 1 page has been completely written; if not, continuing to write; if done, turning to the next Page; then, determining whether all data in the RAM have been written into the flash; if not, continuing to read data in the RAM and write them into flash by Page; if done, turning to a next frame of input binarized encoded image to read n lines of data into a cache; completing generation of a frame of binarized spliced image till all of the consecutive m frames of input binarized encoded image have completed the same operation. In other words, the first frame selects $1$~$n^{th}$ lines of data to be written into the serial-port flash, the second frame selects the $n+1^{st}$~$2n^{th}$ lines of data to be written into the serial-port flash, and the $m^{th}$ frame selects the $((m-1)*n+1)$~$m*n^{th}$ lines of data into the serial-port flash, such that a new frame of binarized spiced image spliced by part of lines of data of m frames exist in the serial-port flash memory, while image compositions for a frame of binarized spliced image refers to the n-line storage structural diagram of FIG. 2.

In one embodiment, the read/write controller can currently store and generate a binarized spliced image; when in use, the read/write controller can read one or more frames of binarized spliced images; the multiple frames of binarized spliced images are generated from multiple groups of structured-light encoded image sequences, respectively. Image data contents of different groups of structured-light encoded image sequences may be different; image data contents of multiple frames of binarized spliced images generated and solidified from different groups of structured-light encoded image sequences will vary with different image data contents of different groups of structured-light encoded image sequences. When in use, a binarized spliced image as a reference encoded image may be simultaneously applied to one or more frames; even only one frame is adopted, a frame of binarized spliced image solidified at a different position may be read out.

In one embodiment, the read/write controller writes one or more frames of binaized spliced images according to an SPI/QPI interface protocol into a serial-port flash to solidify; in the read-out mode, the solidified spliced image data maintains unchanged, and one or more frames of solidified binarized spliced images may be read out consecutively. The read/write controller performs read, write, and erase operations to the serial-port flash memory according to an SPI/

QPI protocol, including data format conversion, erasing the flash, writing in the flash, reading flash data, and address mapping.

Figure 3:
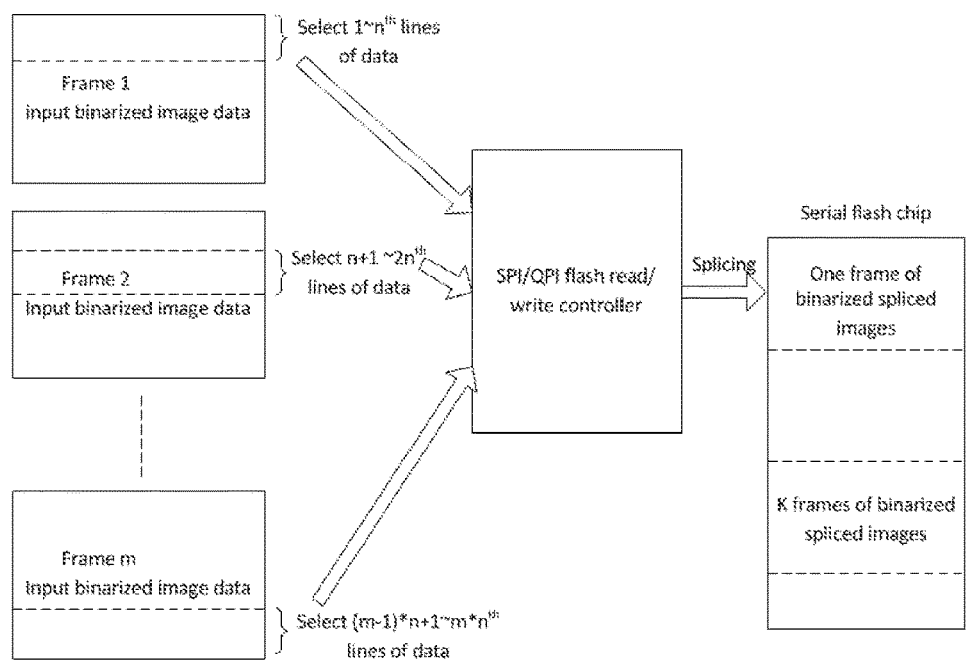
FIG. 3 illustrates a schematic diagram of a method of generating a binarized spliced image using a serial-port flash memory according to an embodiment of the present invention.

In this case, in a serial flash chip, compositions of a frame of binarized spliced image are illustrated in FIG. 3; moreover, in the serial flash chip, multiple frames of binarized spliced images may be stored sequentially at the same time.

In one embodiment, the method based on the basic embodiment implements an apparatus of storage control for depth perception computation, the apparatus comprising a write mapping module, a read/write control module, and a memory;

The write mapping module is configured to sequentially read each part of image data for splicing a binarized spliced image according to a preset write mapping rule, the image data being originated from each frame of image in a group of binarized structured-light encoded image sequences;

The read/write control module is configured to write the each part that is spliced into a binarized spliced image into a memory for storage so as to generate a frame of complete binarized spliced image;

The read/write control module is configured to solidify, through changing an address mapping, the generated binarized spliced image at a certain position within the memory;
wherein;

the group of structured-light encoded image sequences are encoded images that are projected by a laser projector onto a projection plane vertical to its optical axis (Z-axis) and consecutively acquired by a camera, the laser projector being parallel to an optical axis of the camera, a baseline distance being S, a vertical distance of the projection plane from the camera and the laser projector along the optical axis being a known distance d;

The binarized spliced image is a kind of reference encoded image for performing block matching disparity computation to images in a structured-light encoded image sequence which are subjected to the same binarized processing, and outputting a disparity graph represented by an offset for depth perception computation By encapsulating specific steps in the method with modules, the modules may be further implemented with hardware, thereby implementing a simple and clear structure, which is convenient to manage when in use and also has an advantage of small hardware overheads.

The binarized processing is converted from a grayscale image to a binarized encoded image represented by "0, 1," wherein "1" represents a speckle or an encoded symbol, e.g., a laser speckle image, an M-array symbol encoded image, or other structured-light encoded image, including video format conversion (e.g., Bayer, ITU601, ITU656, MIPI interface format conversion), chroma space conversion, grayscale image adaptive de-noising and binarized enhancement, etc. Its purpose is to make the projected image much clearer and reduce noise cancellation through pre-processing the inputted structured-light encoded image, thereby facilitating subsequent depth perception computation.

In this embodiment, a frame of binarized spliced image is generated and solidified from a group of structured-light encoded image sequences; different groups of structured-light encoded image sequences have different image data contents, which may be derived according to different parameters, including adjusting different known distances d, adjusting different image sensor focal lengths f, and among other parameters. Besides, the image data contents of different groups of structured light encoded image sequences may be obtained based on different application environments, e.g., temperature, humidity, work temperature or duration of the laser projector, and the like, resulting in different image data contents. The image data contents of different frames of binarized spliced images generated from images of different groups of structured-light encoded image sequences are also different. When being used, a binarized spliced image as a reference encoded image may be simultaneously applied to one or more frames, and even only one frame is adopted, a frame of binarized spliced image solidified at a different position may also be read out.

Preferably, in order to reduce a PCB layout area, the memory is a serial-port flash that supports SPI/QPI interface protocol. The serial-port flash is selected also because it supports SPI and QPI standard protocols. As the data read/write clock frequency it supports becomes increasingly higher, e.g., supporting a clock of 100 Mhz or higher, the flash may reduce the number of pins needed for reading data within the flash to a great margin compared with the parallel port. In many application scenarios, the serial-port flash has replaced the parallel-port flash, and the application scope becomes increasingly broader. Moreover, when the data throughput frequency of the serial-port flash may satisfy the design requirements, the complexity and pin number of a master chip for reading/writing a flash can be much reduced, thereby facilitating lowering costs and reducing the PCB layout area. With the serial-port flash as a memory for depth perception computation, it facilitates optimization of the chip structure and reduction of the chip area and volume.

In one embodiment, there is provided a work procedure of the read/write control module, specifically comprising:

P1. sequentially inputting a part of image data for being spliced into a binarized spliced image into a cache according to a preset write mapping rule;

P2. writing, through a read/write controller, data one page each time in the cache into a serial-port flash, till the data on the page are completely written;

P3. checking, whether data in the cache have been completely written into the serial-port flash memory; if data remains in the cache, repeating step S2; otherwise, performing step S4;

P4. checking whether all data of images in the group of structured-light encoded image sequence for being spliced into a binarized spliced image have been completely written into a serial-port flash memory; if so, generating a frame of binarized spliced image; otherwise, re-performing steps S1~S3.

In this embodiment, image data needed for forming a binarized spliced image are written into a cache according to a certain writing rule; under the action of a read/write control module, data read into the cache are sequentially written, with a unit of one page as physically stored, into the serial-port flash memory, and after all image data have been completely read, a frame of complete binarized spliced image is generated.

The reason of using one physically stored page as a unit is that programming of the serial-port flash allows at most writing data of 1 page (i.e., 256 bytes, or 2048 bits); moreover, after the flash receives 1-page data, it needs a period of page programming time to refurbish the storage unit; a typical value of the serial-port flash page programming time is typically about 1 ms, with a maximum value being about 5 ms; during the page programming time, the flash will not receive other read, erase, or write instructions. For example, if the frame frequency for inputting the structured-light encoded image sequence is 30 Hz, i.e., 33.33 ms for each frame of image, then after the flash completely stores 1 Page data, the image has past several or even dozens of lines; therefore, it is impossible to real-time store the same frame of image data into a flash using a serial-port flash.

Preferably, the write mapping rule is specifically as follows:

inputting the $(x-1)*n+1^{st}$ to $x*n^{th}$ lines of image data in the $x^{th}$ frame of input binarized encoded image into a cache for storage;

the value of the n is set based on the memory; and it is ensured that within the time of one frame, the read/write control module can store n lines of data into the memory.

Under the write mapping rule, it may be known that if the dimension of the input binarized encoded image is M columns by N lines, consecutive n (n=1, 2, 3 . . . ) lines of data are selected from each frame of input binarized encoded image to be written into a RAM cache module composed of n-line storage for being cacheed, and then are spliced according to a preset write flash mapping method, then m=N/n frames of images in total are needed.

Figure 2:
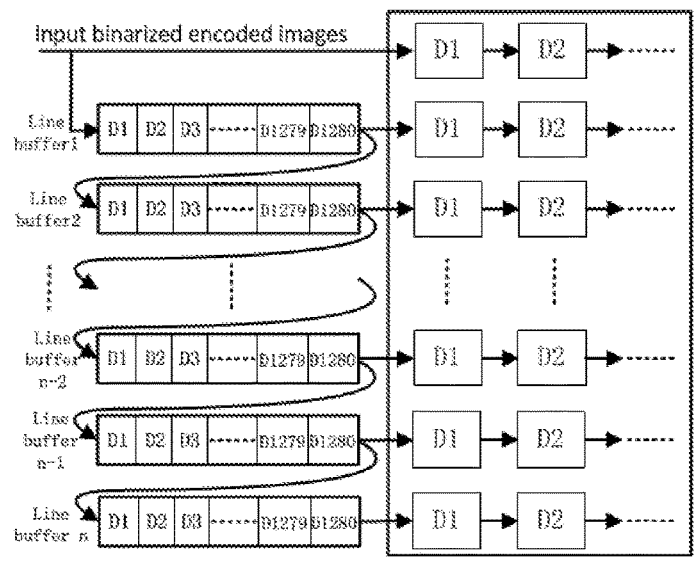
FIG. 2 illustrates a structural diagram of a n-line storage according to an embodiment of the present invention.

FIG. 1 embodies image compositions of a frame of binarized spliced image: caching the $(x-1)*n+1^{st}$ to $x*n^{th}$ lines of image data in the $x^{th}$ frame of input binarized encoded image into a RAM; writing data in the RAM, by a read/write control module, into a flash 1 page per time; determining, by the read/write control module, whether the 1 page has been completely written; if not, continuing to write; if done, turning to the next Page; then, determining whether all data in the RAM have been written into the flash; if not, continuing to read data in the RAM and write them into flash by Page; if done, turning to a next frame of input binarized encoded image to read n lines of data into a cache; completing generation of a frame of binarized spliced image till all of the consecutive m frames of input binarized encoded image have completed the same operation. In other words, the first frame selects $1\sim n^{th}$ lines of data to be written into the serial-port flash, the second frame selects the $n+1^{st}\sim 2n^{th}$ lines of data to be written into the serial-port flash, and the $m^{th}$ frame selects the $((m-1)*n+1)\sim m*n^{th}$ lines of data into the serial-port flash, such that a new frame of binarized spiced image spliced by part of lines of data of m frames exist in the serial-port flash memory.

More preferably, the read/write control module can currently store and generate a binarized spliced image; when in use, the read/write control module can read one or more frames of binarized spliced images; the multiple frames of binarized spliced images are generated from multiple groups of structured-light encoded image sequences, respectively. Image data contents of different groups of structured-light encoded image sequences may be different; image data contents of multiple frames of binarized spliced images generated and solidified from different groups of structured-light encoded image sequences will vary with different image data contents of different groups of structured-light encoded image sequences. When in use, a binarized spliced image as a reference encoded image may be simultaneously applied to one or more frames; even only one frame is adopted, a frame of binarized spliced image solidified at a different position may be read out.

In this embodiment, the read/write control module writes one or more frames of binaized spliced images according to an SPI/QPI interface protocol into a serial-port flash to solidify; in the read-out mode, the solidified spliced image data maintains unchanged, and one or more frames of solidified binarized spliced images may be read out consecutively. The read/write controller performs read, write, and erase operations to the serial-port flash memory according to an SPI/QPI protocol, including data format conversion, erasing the flash, writing in the flash, reading flash data, and address mapping.

In this case, in a serial flash chip, compositions of a frame of binarized spliced image are illustrated in FIG. 3; moreover, in the serial flash chip, multiple frames of binarized spliced images may be stored sequentially at the same time.

Figure 4:
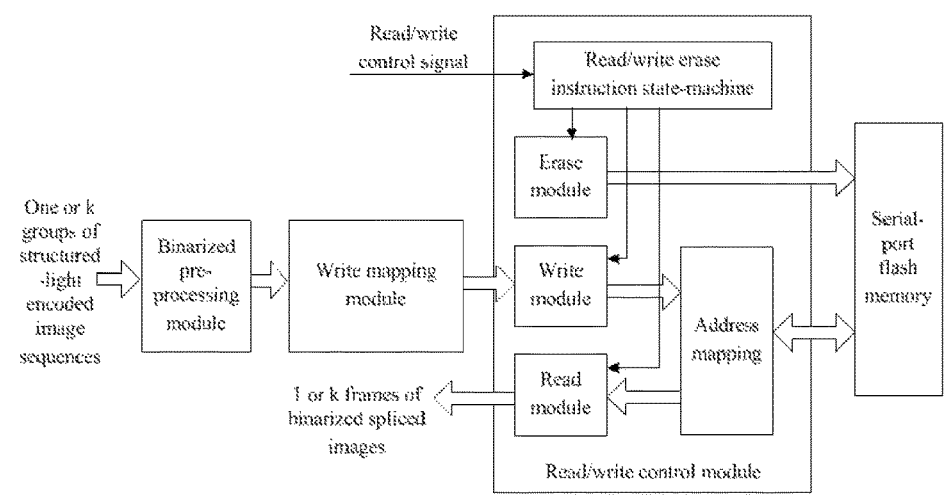
FIG. 4 illustrates a schematic diagram of implementing a method of storage control for depth perception computation using a serial-port flash memory in an embodiment of the present invention.

With reference to FIG. 4, an apparatus for storing depth perception computing that applies the write mapping rule above will be illustrated in detail. In the apparatus the memory is a serial-port flash memory. In the apparatus, there is further added a binarized pre-processing module for performing the same binarized processing to one or more groups of structured-light encoded image sequence. After the images of a group of structured-light encoded sequence are inputted into the binarized pre-processing module, the group of structured-light encoded sequence images enters into the write mapping module after being subjected to the same binarized processing. The module reads in sequence the image data for being spliced into a binarized spliced image from corresponding images in the group of structured-light encoded sequence images and puts them into the cache. The read/write control module is further differentiated by functions, i.e., the read/write control module comprises a write module, a read module, an address mapping module, a read/write erase instruction state machine, and an erase module; the working mechanism of the read/write control module is that the read/write erase instruction state machine controls data in the erase module erase cache according to a read/write control signal issued by the internal logic controller or external processor; the write mapping module puts the image data for being spliced into a binarized sliced image into a buffer; under the read/write control signal, the read/write erase instruction state machine controls the write module to put the image data into the serial-port flash memory via the address mapping module; images in the same group of structured-light encoded image sequence, under the control of the address mapping module, are mapped in a consecutive storage area for solidification, finally generating a frame of binarized sliced image; when the binarized spliced image is to be used, the read/write erase instruction state machine, under the control of the read/write control signal, controls the read module to read out the desired binarized spliced image. It may read one frame, or consecutively read k frames. The image data contents in the k frame are different.

Although the embodiments above are carried out in specific images, they are not intended to limit the present invention. The present invention may be likewise applied to a similar structured-light encoded image or other image; the binarized spliced image for solidification may be 1 or more frames; when the image is read, a plurality of frames may be read out simultaneously; the memory for storing a binarized spliced image may be a serial-port flash, or a parallel-port flash or other memory.

The present invention has been detailed above. In the present disclosure, specific individual instances have been applied to illustrate the principle and embodiments of the present invention. Illustration of the embodiments above is only for facilitating understanding of the method of the present invention and the core idea thereof; meanwhile, to those skilled in the art, alterations may be made to the preferred embodiments and application scope. In view of the above, the contents of the present disclosure should not be understood as a limitation to the present invention.

The invention claimed is:

1. A method of storage control for depth perception computation, comprising:
sequentially reading each part of image data for splicing a binarized spliced image according to a preset write mapping rule, the image data being originated from each frame of image in a group of binarized structured-light encoded image sequences; writing, by a read/write controller, the each part that is spliced into a binarized spliced image into a memory for storage, so as to generate a frame of complete binarized spliced image; then, through changing an address mapping, solidifying the generated binarized spliced image at a certain position within the memory;
wherein,
the group of structured-light encoded image sequences are encoded images that are projected by a laser projector onto a projection plane vertical to its optical axis (Z-axis) and consecutively acquired by a camera, the laser projector being parallel to an optical axis of the camera, a baseline distance between the laser projector and the camera being S, a distance of the projection plane from the camera and the laser projector along the optical axis being a known distance d;
the binarized spliced image is a kind of reference encoded image for performing block matching disparity computation to images in a structured-light encoded image sequence which are subjected to binarizing processing, and for outputting a disparity graph represented by an offset for depth perception computation; and
the depth perception computation derives a corresponding depth value d' according to a depth computation equation below in conjunction with a camera focal distance f, spot distance $\mu$ of the camera image sensor, the baseline distance S between the laser projector and the camera, and an offset parameter $\Delta m$ ($\Delta x$ or $\Delta y$) of the disparity graph, and the known distance parameter d of the reference encoded image:

$$d' = d - \frac{\Delta m \mu d^2}{fS + \Delta m \mu d} = \frac{fSd}{fS + \Delta m \mu d}.$$

2. The method according to claim 1, characterized in that:
the memory is a serial-port flash for supporting an SPI/QPI interface protocol.

3. The method according to claim 1, characterized in that: generating a binarized spliced image comprises:
S1. sequentially inputting a part of image data for being spliced into a binarized spliced image into a cache according to the preset write mapping rule;
S2. writing, through the read/write controller, data one page each time in the cache into a serial-port flash, till the data on the page are completely written;
S3. checking, whether data in the cache have been completely written into the serial-port flash memory; if data remains in the cache, repeating step S2; otherwise, performing step S4;
S4. checking whether all data of images in the group of structured-light encoded image sequence for being spliced into a binarized spliced image have been completely written into the serial-port flash memory; if so, generating a frame of binarized spliced image; otherwise, re-performing steps S1 through S3.

4. The method according to claim 1, characterized in that:
the write mapping rule comprises:
inputting the $(x-1)*n+1^{st}$ to $x*n^{th}$ lines of image data in the $x^{th}$ frame of input binarized encoded image into a cache for storage, wherein
the value of the n is set based on the memory and it is ensured that within a time of one frame, the read/write controller can store n lines of data into the memory.

5. The method according to claim 1, characterized in that:
the read/write controller can currently store and generate a binarized spliced image; when in use, the read/write controller can read one or more frames of binarized spliced images; and
multiple frames of binarized spliced images are generated from multiple groups of structured-light encoded image sequences, respectively.

6. An apparatus of storage control for depth perception computation, characterized in that the apparatus comprises a write mapping module, a read/write control module, and a memory; wherein
the write mapping module is configured to sequentially read each part of image data for splicing a binarized spliced image according to a preset write mapping rule, the image data being originated from each frame of image in a group of binarized structured-light encoded image sequences;
the read/write control module is configured to write the each part that is spliced into a binarized spliced image into the memory for storage so as to generate a frame of complete binarized spliced image;
the read/write control module is configured to solidify, through changing an address mapping, the generated binarized spliced image at a certain position within the memory;
the group of structured-light encoded image sequences are encoded images that are projected by a laser projector onto a projection plane vertical to its optical axis (Z-axis) and consecutively acquired by a camera, the laser projector being parallel to an optical axis of the camera, a baseline distance between the laser projector and the camera being S, a distance of the projection plane from the camera and the laser projector along the optical axis being a known distance d;
the binarized spliced image is a kind of reference encoded image for performing block matching disparity computation to images in a structured-light encoded image sequence which are subjected to binarizing processing, and for outputting a disparity graph represented by an offset for depth perception computation; and
the depth perception computation derives a corresponding depth value d' according to a depth computation equation below in conjunction with a camera focal distance f, spot distance $\mu$ of the camera image sensor, the baseline distance S between the laser projector and the camera, and an offset parameter $\Delta m$ ($\Delta x$ or $\Delta y$) of the disparity graph, and the known distance parameter d of the reference encoded image:

$$d' = d - \frac{\Delta m \mu d^2}{fS + \Delta m \mu d} = \frac{fSd}{fS + \Delta m \mu d}.$$

7. The apparatus according to claim 6, characterized in that:
the memory is a serial-port flash for supporting an SPI/QPI interface protocol.

8. The apparatus according to claim 7, characterized in that:
the read/write control module is further configured to:
P1. sequentially input a part of image data for being spliced into a binarized spliced image into a cache according to a preset write mapping rule;
P2. write, through the read/write controller, data one page each time in the cache into the serial-port flash, till the data on the page are completely written;
P3. check, whether data in the cache have been completely written into the serial-port flash memory; if data remains in the cache, repeating step S2; otherwise, performing step S4;
P4. checking whether all data of images in the group of structured-light encoded image sequence for being spliced into a binarized spliced image have been completely written into the serial-port flash memory; if so, generating a frame of binarized spliced image; otherwise, re-performing steps P1 through P3.

9. The apparatus according to claim 6, characterized in that:
the write mapping rule comprises:
inputting the (x−1)*n+1st to x*nth lines of image data in the xth frame of input binarized encoded image into a cache for storage, wherein
the value of the n is set based on the memory, and it is ensured that within a time of one frame, the read/write controller can store n lines of data into the memory.

10. The apparatus according to claim 6, characterized in that:
the read/write control module can currently store and generate a binarized spliced image; when in use, the read/write control module can read one or more frames of binarized spliced images; and
multiple frames of binarized spliced images are generated from multiple groups of structured-light encoded image sequences, respectively.

* * * * *